F. M. NOLDER.
DIRIGIBLE HEADLIGHT.
APPLICATION FILED FEB. 19, 1913.

1,084,471.

Patented Jan. 13, 1914.

Witnesses
Wm. H. Mulligan.
V. B. Hillyard.

Inventor
Francis M. Nolder

By Victor J. Evans.
Attorney

UNITED STATES PATENT OFFICE.

FRANCIS M. NOLDER, OF WESTBORO, OHIO.

DIRIGIBLE HEADLIGHT.

1,084,471.

Specification of Letters Patent. Patented Jan. 13, 1914.

Application filed February 19, 1913. Serial No. 749,447.

*To all whom it may concern:*

Be it known that I, FRANCIS M. NOLDER, a citizen of the United States, residing at Westboro, in the county of Clinton and State of Ohio, have invented new and useful Improvements in Dirigible Headlights, of which the following is a specification.

The invention provides novel means for simultaneously moving the side headlights of an automobile so as to throw the beams of light in the direction of travel of the machine whether going straight ahead or rounding a curve.

The invention is of such construction as to admit of the headlights turning so as to remain substantially parallel with the respective steering wheels to which they are connected, with the result that the rays of light are shed in a direction parallel with the inclination of the steering wheels when turned to direct the machine from a straight course.

The invention consists of the novel features, details of construction and combination of parts, which hereinafter will be more particularly set forth, illustrated in the accompanying drawing, and pointed out in the appended claim.

Figure 1:
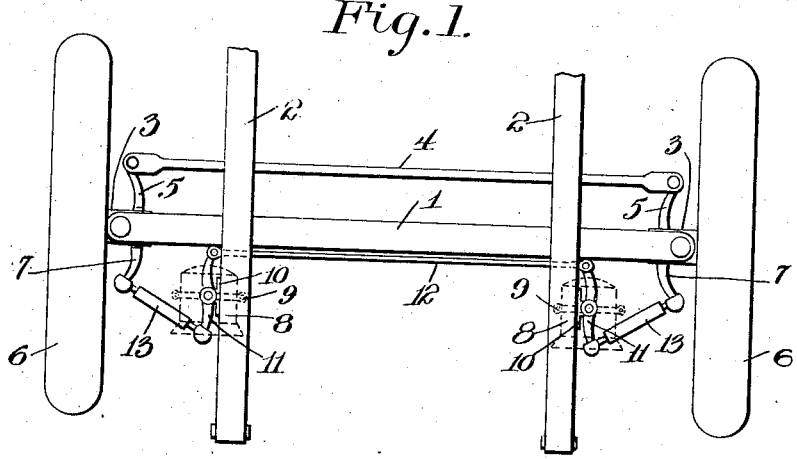
Figure 2:
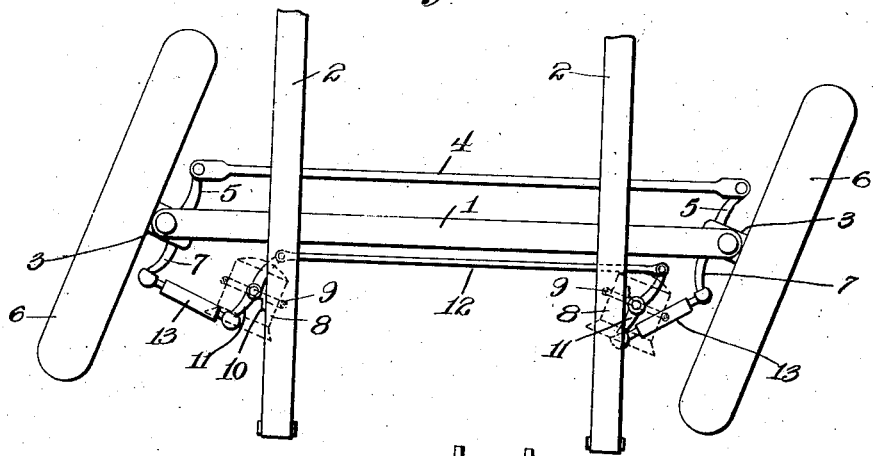
Figure 3:
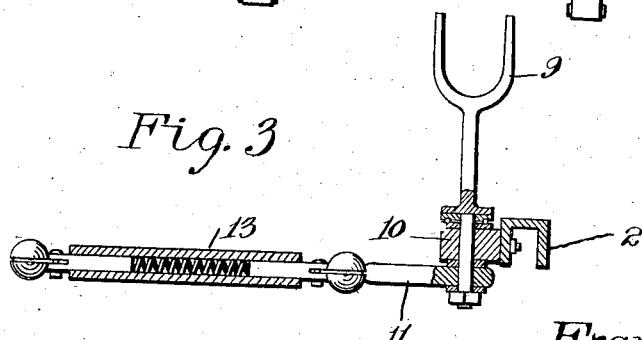

Referring to the drawing, forming a part of the specification, Figure 1 is a top plan view of the front portion of the frame of an automobile provided with a headlight mechanism embodying the invention, the full lines showing the position of the parts when the steering wheels and lamps point straight ahead. Fig. 2 is a view similar to Fig. 1, showing the relative position of the parts when the steering wheels and lamps are turned. Fig. 3 is a sectional detail, showing the bearing of a lamp support and the telescoping connection between a lamp and steering knuckle in section, the parts being illustrated on a larger scale.

Corresponding and like parts are referred to in the following description, and indicated in all the views of the drawing, by the same reference characters.

The axle 1, side bars 2 and steering knuckles may be of any construction such as commonly provided in vehicles of the automobile type. A rod or drag link 4 connects arms 5 projecting from the steering knuckles 3 to cause both to move in unison. It is to be understood that the arms 5 may have any relative position according to the design of the machine so as to cause the steering wheels 6 to remain parallel at all angular positions. Other arms 7 project from the steering knuckles 3 in an opposite direction to the arms 5 and are adapted to be connected with the headlights.

The headlights 8 are mounted upon forked supports 9 which are journaled in brackets 10 secured to the side bars 2. The supports 9 have anti-friction bearings interposed between them and the brackets 10 to reduce the friction to the smallest amount possible so that the headlights may turn with the greatest ease possible. Levers 11 are secured to the lower ends or stems of the forked supports 9 in any manner so as to turn therewith. The levers 11 may have any relative position according to the manner of connecting the steering wheels so as to cause the headlights to turn with the respective steering wheels and remain parallel therewith. A rod 12 connects the rear arms of the levers 11 to cause both of such levers to move synchronously. Extensible connections 13 are interposed between the front arms of the levers 11 and the arm 7. The members comprising the extensible connections 13 are coupled to the respective arms by means of universal joints so as to provide for the various changes of angles between the arms and connections incident to the spring action of the axle and chassis of the machine and to the movements of the steering wheels when turned to properly direct the course of the machine. The members comprising each of the extensible connections 13 have a telescopic arrangement to admit of such connection lengthening or shortening to accommodate itself to the varying distance between the arms connected thereby.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In combination side headlights mounted to turn about vertical axes, levers connected intermediate of their ends to the headlight supports, a rod connecting corresponding arms of the levers, steering knuckles provided with oppositely disposed arms, extensible connections between the other arms of the before mentioned levers and one set of arms of the steering knuckles, and a rod connecting the other arms of the steering knuckles.

In testimony whereof I affix my signature in presence of two witnesses.

FRANCIS M. NOLDER.

Witnesses:
J. E. HACKETT,
O. J. PFISTER.